(12) United States Patent
Smith et al.

(10) Patent No.: US 9,547,996 B2
(45) Date of Patent: Jan. 17, 2017

(54) FREEFORM MATHEMATICAL PARSING AND GRADING METHOD AND SYSTEM

(75) Inventors: Hildon Smith, Raleigh, NC (US);
Terrance T. Ford, Raleigh, NC (US)

(73) Assignee: Advanced Instructional Systems, Inc., Raleigh, NC (US)

( * ) Notice: Subject to any disclaimer, the term of this patent is extended or adjusted under 35 U.S.C. 154(b) by 600 days.

(21) Appl. No.: 13/191,805

(22) Filed: Jul. 27, 2011

(65) Prior Publication Data
US 2012/0189991 A1    Jul. 26, 2012

Related U.S. Application Data

(60) Provisional application No. 61/367,953, filed on Jul. 27, 2010.

(51) Int. Cl.
*G09B 5/00*  (2006.01)
*G09B 7/00*  (2006.01)

(52) U.S. Cl.
CPC ...................................... *G09B 7/00* (2013.01)

(58) Field of Classification Search
CPC ............... G09B 7/00; G09B 5/00; G09B 7/02; G06F 17/2705; G06F 17/271; G06F 17/2872
USPC .................................. 434/188, 191, 201, 209
See application file for complete search history.

(56) References Cited

U.S. PATENT DOCUMENTS

| | | | | |
|---|---|---|---|---|
| 5,495,413 | A  * | 2/1996 | Kutsumi et al. | 704/4 |
| 7,970,773 | B1 * | 6/2011 | Thirumalai et al. | 707/749 |
| 2005/0137849 | A1* | 6/2005 | Parkinson | 704/4 |
| 2011/0244434 | A1* | 10/2011 | Livne et al. | 434/188 |

* cited by examiner

*Primary Examiner* — Xuan Thai
*Assistant Examiner* — Jerry-Daryl Fletcher
(74) *Attorney, Agent, or Firm* — Goodwin Procter LLP

(57) ABSTRACT

Described herein are embodiments of systems, methods, apparatus and computer program products that accept student input and use a computer to process its mathematical meaning. The input can then be algorithmically tested for certain mathematical criteria. Those test results then allow the system to output immediate assessment, grades, and feedback.

20 Claims, 21 Drawing Sheets

"sin sin xy"
CORRECT
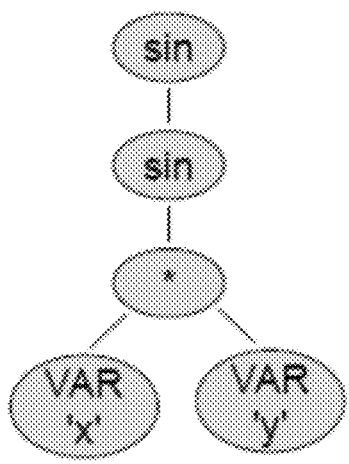
INCORRECT
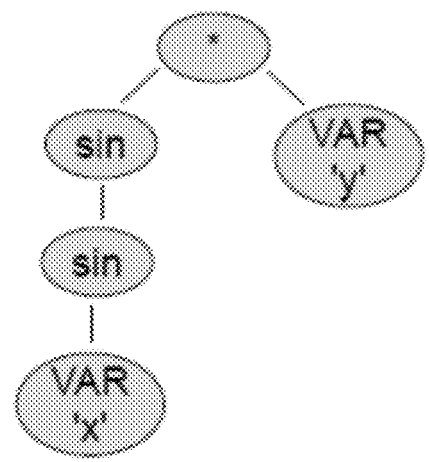
FIG. 10

Grammar for Math Expressions with Implicit Functions ← 1100

(1) E → E PLUS T
(2) E → T (3) T → T_a
(4) T → T_s         ← 1102
                        ← 1104
(5) T_a → T TIMES F_a
(6) T_a → T SPACE F_a  ⎫
(7) T_a → T_s F_a      ⎬ — (Implicit multiplication)
(8) T_a → F_a          ⎭

(9) T_s → T TIMES F_s
(10) T_s → T SPACE F_s  ⎫
(11) T_s → T_s F_s      ⎬ — (Implicit multiplication)
(12) T_s → F_s          ⎭

(13) F_a → B_s CARET F_a
(14) F_a → B_a

(15) F_s → B_s CARET F_s      ← 1106
(16) F_s → B_s

(17) B_a → FNAME SPACE T — (Assimilator)
(18) B_a → FNAME F_a

(19) B_s → CONSTANT           ← 1108
(20) B_s → VARIABLE
(21) B_s → LPAREN E RPAREN
(22) B_s → FNAME F_s   ——— (Soliton)

(23) PLUS → '+'
(24) TIMES → '*'
(25) CARET → '^'
(26) LPAREN → '('
(27) RPAREN → ')'
(28) SPACE → ' '
(29) FNAME → 's' 'i' 'n'
(30) VARIABLE → 'x'
(31) VARIABLE → 'y'

FIG. 11

```
VARIABLE → La Ll Lp Lh La          1600
B_s → UNKNOWN
UNKNOWN → UNKNOWN L
UNKNOWN → L
La → a       ⎫
Ll → l       ⎪
Lp → p       ⎬ singletons
Lh → h       ⎪
L → letter   ⎭
```

FIG. 16

Vars: [ 'al', 'lp', 'pa' ]
Input: "zalpay"
Interpretations: ( U = UNKNOWN, V = VARIABLE )

```
z  *  al  *  pa  *  y               ✓
↑     ↑      ↑      ↑
U     V      V      U za  *  lp  *  ay                    ✓
↑      ↑      ↑
U      V      U zalpay                              X
↑
U
```

FIG. 17

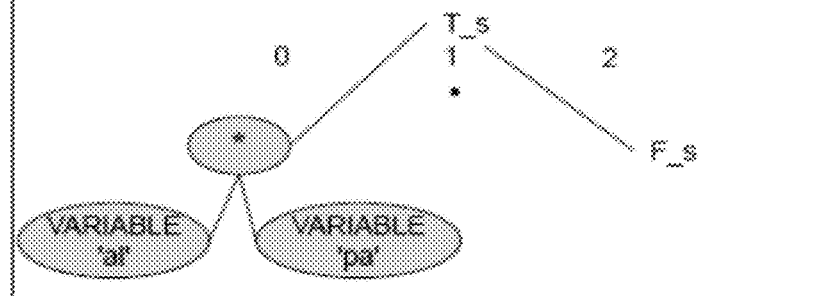
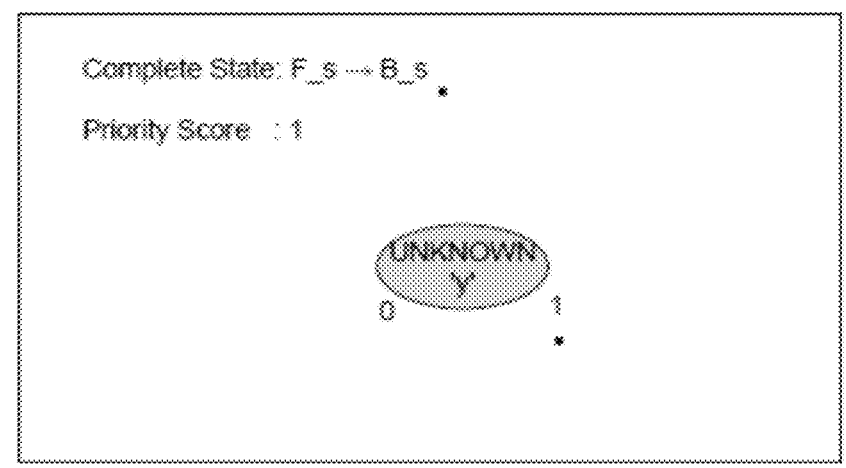
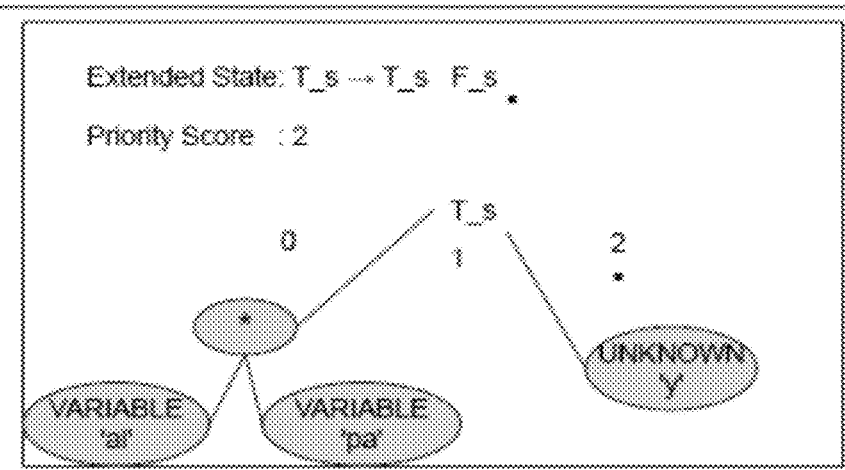
FIG. 18

| extendee_score | extension_score | new_score |
|---|---|---|
| 3 | 3 | 3 |
| 3 | 2 | 2 |
| 3 | 1 | 2 |
| 2 | 3 | 2 |
| 2 | 2 | 2 |
| 2 | 1 | 2 |
| 1 | 3 | 2 |
| 1 | 2 | 2 |
| 1 | 1 | 1 |

FIG. 19

$\{a \times t\} = \{(1, 0.123), (1, 0.456), (1, 0.789),$
$(2, 0.123), (2, 0.456), (2, 0.789),$
$(3, 0.123), (3, 0.456), (3, 0.789)\}$ key: "{x, t, x+t}"    ← 2100 response: "{t, x, 2x}"

feedback: { t,  x,  2*x }
           ✓   ✓   ✗

FIG. 21 key: "{1, 2}"
response: "{2, 2, 2, 2}"

nk = 4
Nk = 2
nr = 1
Nr = 4

Nr − nr = 3 ( three extra 2's )

$$\text{partial\_credit} = \frac{4}{2+3} = \frac{4}{5}$$

FIG. 22 key: "{ 2, 3, 100 }"

response: "{2, 100, 1}"

response interpretations:

{ 2100, 1 }   -or-   { 2, 100, 1 } partial credit:

0   -or-   2/3 feedback:

FREEFORM MATHEMATICAL PARSING AND GRADING METHOD AND SYSTEM

CROSS-REFERENCE TO RELATED APPLICATIONS

This application claims the benefit of U.S. Application No. 61/367,953, filed Jul. 27, 2010, which is hereby incorporated herein by reference in its entirety.

BACKGROUND

One of the main applications of an online homework grading system such as, for example, WebAssign (Advanced Instructional Systems, Inc.; Raleigh, N.C.) is to grade so-called "free response" questions. Take, for example, the following exercise and corresponding answer key.

Exercise: Find the indefinite integral.

$$\int -\frac{1}{x} dx.$$

Answer Key: $-\ln(x)+C$.

In order to deliver and grade this question with an online system, the software must be able to accept many different variations on the answer key. For instance, if a student wrote his or her response as $$\ln\frac{1}{x} + C,$$

he or she should still be awarded credit. After all, the student has only applied the laws of logarithms to rewrite the expression in a mathematically valid way. Notice also that the student has not used parentheses to explicitly delimit the argument to the natural log function. If the student wanted to use parentheses, such as $$\ln\left(\frac{1}{x}\right) + C,$$

his or her answer should still be accepted. In general, there will be infinitely many ways to write equivalent forms of the required expression, and the homework system cannot predict what form the student's answer will take.

One traditional workaround for this problem is to force students to enter their answers in a specific form. Unfortunately, this introduces many new problems. Foremost, restricting responses to a specific form destroys the "free response" aspect of the question that is so important pedagogically. Also, a homework system that accepts only specific forms of a response may cause usability issues. Worse yet, this restriction may mislead students into believing their equivalent response is mathematically incorrect.

Taking the idea of equivalent and correct responses even further, it is possible that responses like $$\ln\frac{1}{x} + 2C$$

should be accepted as well. After all, this answer is no less general than the one shown in the answer key, since C is assumed to be any arbitrary real number. If answers like these are to be accepted, then $$\ln\frac{1}{x} + \ln C$$

should also be accepted, since any real number can be written as ln C for some number C. Therefore, even answers like $$\ln\frac{C}{x}$$

should be accepted for the original answer key of $-\ln(x)+C$.

In situations like this, the student's response should be considered correct if and only if it satisfies some specific mathematical conditions. The original answer key is merely one example of many correct answers. Questions requiring this sort of grading occur frequently in all areas of mathematics instruction.

A similar problem arises when numerical approximations are allowed. Take, for example, the following question and answer.

Exercise: Use a graphing utility to approximate a sinusoidal function with period 4 which has a peak at (1, 3.7), and a valley at (3, 1.7).

Answer Key: (See FIG. 1)

$$\sin\left(\frac{\pi}{2}x\right) + 2.7.$$

Students who use a calculator to approach this problem may obtain answers like $$\sin\frac{3.14x}{2} + 2.69$$

or even 2.7+sin 1.57x

Exercises involving long numerical calculations are common, especially in academic disciplines such as physics. The ability to accept expressions that are approximately right is crucial for an online homework system.

It would be desirable to develop systems and methods that overcome challenges present in the art, some of which are described above, including providing a general framework for effectively delivering and automatically grading these types of "open-ended" questions.

SUMMARY

Described herein are embodiments of systems, methods, apparatus and computer program products that accept student input and use a computer to process its mathematical meaning. The input can then be algorithmically tested for certain mathematical criteria. Those test results then allow the system to output immediate assessment, grades, and feedback.

In one embodiment, a system for freeform mathematical parsing comprises: a memory for storing a key; and a processor in signal communication with the memory, the processor configured to perform the steps of: defining a grammar for an arithmetic expression, the grammar comprising an implicit multiplication expression and an implicit function expression; defining a production in the grammar for known variables; defining a production in the grammar for unknown variables; receiving an input; parsing the input based upon the grammar to generate a plurality of parse trees collectively defining the input; and assigning a grade to the input based upon a comparison of at least one of the parse trees against the key.

Methods for freeform mathematical parsing are also disclosed. One method comprises the steps of: defining a grammar for an arithmetic expression, the grammar comprising an implicit multiplication expression and an implicit function expression; defining a production in the grammar for known variables; defining a production in the grammar for unknown variables; receiving an input; parsing the input based upon the grammar to generate a plurality of parse trees collectively defining the input; and assigning a grade to the input based upon a comparison of at least one of the parse trees against a key.

Another method comprises the steps of: defining a grammar for an arithmetic expression, the grammar comprising an implicit multiplication expression and an implicit function expression; defining a production in the grammar for known variables; defining a production in the grammar for unknown variables; receiving an input including a plurality of elements collectively defining a mathematical expression; parsing the input based upon the grammar to define each of the elements; and assigning a grade to the input based upon a grading routine comprising: comparing each the elements of the input against each of a plurality of elements of a key; verifying whether each of the elements of the input matches at least one of the elements of the key; verifying whether each of the elements of the key matches at least one of the elements of the input.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 10 shows a comparison of the preferred operator tree and a spurious operator tree, for the expression "sin sin xy";

FIG. 11 is an exemplary grammar for a mathematical expression with an implicit function;

FIG. 16 illustrates productions for a known variable "alpha", along with productions for any unknown variable;

FIG. 17 illustrates a plurality of interpretations derived from the productions of FIG. 16;

FIG. 18 illustrates a flow diagram of a method for extending a partial parse;

FIG. 19 is a table of priority scores;

FIG. 21 is a representation of an exemplary grading process;

FIG. 22 is a representation of a partial credit grading process;

FIG. 23 is a representation of how partial credit applies to an exemplary grading process;

DETAILED DESCRIPTION

Figure 1:
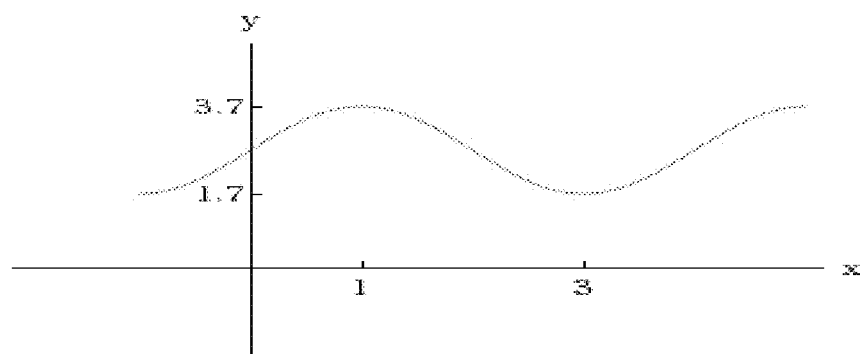
FIG. 1 is an example of a graphing utility to approximate a sinusoidal function with period 4 which has a peak at (1, 3.7), and a valley at (3, 1.7)

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "Comprising" and "comprises," means "including but not limited to," and is not intended to exclude, for example, components, integers, or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Overview

Described herein are embodiments of systems, methods, apparatus and computer program products that accept student input and use a computer to process its mathematical meaning. The input can then be algorithmically tested for certain mathematical criteria. Those test results allow the system to output immediate assessment, grades, and feedback.

In one aspect, a mathematical language can be defined as a set of strings. Since each string represents a mathematical expression, this set is theoretically infinite. However, the set can be precisely described using formal language theory.

A computer can "understand" this language by parsing the strings into data structures and storing the data structures in memory. Sophisticated mathematical operations can be performed on the resulting data structures, and grades can be assigned. In an aspect, the system can function as an online interpreter for a programming language, like Perl, for example. A user can enter plain text as input, and the system can create a program from the input, as long as the text conforms to the rules of the language. The output (or grade) can be returned to the user.

Figure 2:
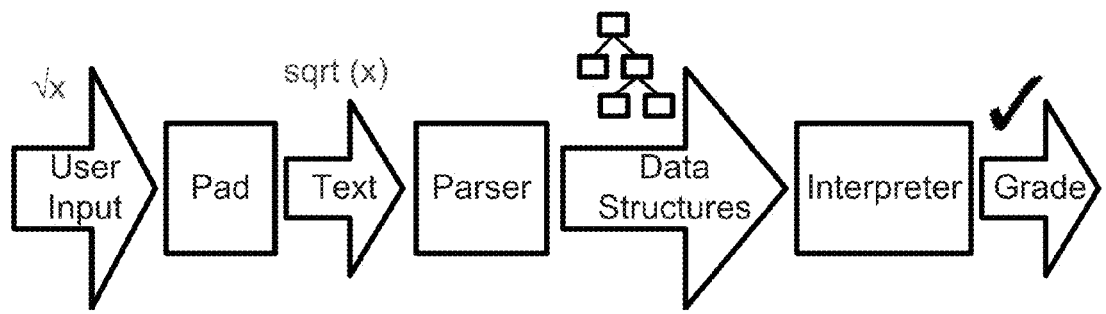
FIG. 2 represents an exemplary flow of information.

With the addition of WebAssign "Pads" or Palette entry tools, plain text can be produced automatically, and the system can become much more user-friendly. Using mathPad, for example, the student can view a mathematically typeset version of their answer. FIG. 2 represents an exemplary flow of information.

In FIG. 2, each block represents a software system. The "pad" represented by the first block is a user-interface component that allows users to click buttons and use keyboard input to construct mathematical notation that "looks right" to them. The pad is meant to handle the visual aspects of the user's notation, such as drawing fraction bars, drawing square root symbols, and superscripting and subscripting parts of the expression. The pad maintains its own data structure for the visual aspects of the expression being built, and redraws the presentation of the expression in real time, in response to user input. Upon submission of an expression, the pad dumps the expression to a string of plain text notation suitable for parsing with a formal grammar.

The parser represented by the second block has no user-facing aspects. It takes a string of plain text, and constructs operator trees, representing one or more valid interpretations of the input. These data structures are suitable for numerical or algebraic manipulation by the interpreter.

The interpreter component represented by the third block takes one or more operator trees representing a response, and compares them against the operator tree representing the answer key. It assigns a grade of CORRECT or INCORRECT to the response, depending on whether any of the response interpretations (trees) were judged to be equivalent to the answer key. The definition of equality being applied by the interpreter during each "tree to tree" comparison can be implemented as a function which operates on two trees. Furthermore, if no response interpretation was deemed CORRECT, the interpreter provides feedback to the user, based on the interpretation of their input that came closest to being correct. In this context, "closeness" to the correct answer is defined by a partial credit score which is computed during the application of the interpreter's equality algorithm.

Parser

The system disclosed herein can comprise a parser for traditional mathematical notation. After studying the notation styles used in various mathematics textbooks and publications, it is apparent that the language of mathematics is fundamentally different from a programming language. A programming language like C++ or Java is purposefully designed, usually by a single person, with the intention of being parsed by a computer. Furthermore, once a compiler has been written for that language, the syntax is unlikely to change. In contrast, the language of mathematics has continuously evolved over the course of human history via the contributions of many different people. As a result, mathematical notation is extremely flexible and expressive; however, with that flexibility and power comes the possibility of ambiguity.

Ambiguity in this context is usually the result of different overlapping notational constructs applying to the same portion of an expression. For example, multiplication between two terms is commonly notated by separating the two terms by a space, as in:

x y=1.

However, spaces are also commonly employed as argument separators when using functions without parentheses. The following example clearly shows both uses of the space character:

x y=sin 2z.

In order to allow students to write notation in this way, it was necessary to permit the computer to interpret the space character in either way, whenever appropriate. Now, imagine a student enters the following expression:

sin x y.

It is not clear whether the student meant to use the second space as a separator, meaning:

sin(x) y or as multiplication between x and y, meaning:

sin(x y).

Ambiguities like these have the potential to appear in many different mathematical constructions. As another example, consider an expression like:

x+1,234+y.

This expression could mean either:

x+1234+y or: "a two-element list consisting of the element 'x+1' and the element '234+y'".

Since both of these interpretations could represent valid answers in the right context, it is difficult for a computer to decide which one is "better" in any sense.

Accordingly, the methods and systems provided can allow all academically accepted mathematical notations, along with ambiguous notation. In this way, the language of mathematics is a lot like the English language. It is always possible for a speaker of good English to clearly and unambiguously say what he or she means. However, there is nothing stopping a novice English speaker from uttering ambiguous sentences like "I saw a man with a telescope."

This ambiguous sentence is similar to the ambiguous expression "sin x y": it is not clear whether the telescope goes with "man" or with "saw"!

Even though the language of traditional math notation has the potential for ambiguity, a computer is required to parse it in a robust fashion. How can ambiguous inputs be dealt with if and when they occur? In the traditional parser construction methods used for programming languages, this problem is usually dealt with by introducing disambiguating rules that make the parser choose one interpretation over another whenever a parsing conflict occurs. This approach is computationally efficient, but not user-friendly. In fact, there are so many possibilities for ambiguity in natural mathematical language that learning all of the disambiguating rules would amount to learning a new programming language, just for the purpose of entering answers to homework questions. In the interest of preserving students' natural notation styles as much as possible, the methods and systems can be configured to process the ambiguity.

In one aspect of a parser, techniques from the field of Natural Language Processing can be used to parse and return all valid interpretations for any given input. In the "sin x y" example, the described embodiment of a parser can actually return two different data structures, representing sin(x) y and sin(x y) respectively.

There are several efficient methods that can parse and return ambiguous results. However, most modern natural language applications use heuristics to assign probabilities to the results, and then return only the most probable interpretation. For the purposes of an online homework system, this is not sufficient. It would be a mistake to presume to know what a student meant based solely on an arbitrary notion of probability.

Therefore, in an aspect, a three-tiered ranking system can be used to organize the interpretations for a given input. In an aspect, an interpretation can be Rank 1 if it consists entirely of known entities. For example, an interpretation "2*x" uses only numbers and expected variables. Interpretations can be Rank 2 if the interpretation contains a mixture of known and unknown entities. For example, if the student entered "y*2u" instead of the expected "y*2x", the interpretation corresponding to this input can be given a rank of 2. A rank of 3 can be given to interpretations consisting entirely of unknown entities. This might happen if a student enters the string "I don't know" as input. After parsing is complete, all the interpretations in the highest ranking tier can be returned. Interpretations from lower-ranking tiers can be deemed irrelevant and discarded.

Also, the mathematical grammar being used for parsing can be designed to help eliminate spurious interpretations before they are formed. For example, the character "i" has multiple meanings including the imaginary unit $\sqrt{-1}$ and the 3-dimensional unit vector <1,0,0>. But when a student inputs i+2, the system can be configured to ignore the vector interpretation because a scalar cannot be added to a vector. In this way, many spurious interpretations can be avoided while still considering all salient interpretations.

Once the input is parsed by a parsing module, the step of actually grading the parsed input still exists. For example, consider a question that requires the derivative of the response to exactly match the derivative of the key. In this scenario, the parsed versions of both the key and response can be passed to an auxiliary computer algebra system and differentiated symbolically. Then, the resulting derivatives can both be simplified as much as possible. Finally, the canonicalized results can be compared exactly in order to assign a grade. One computer algebra system that can be employed is Mathematica™, so the grading requirements can be entered into the question as a Mathematica program. Such a program can make use of a special variable referred to as "response," which can serve as a placeholder to be filled in after the student's input has been received and parsed. This approach offers almost unlimited grading possibilities, but it is subject to the limitations of the computer algebra system's canonicalization routines.

To address the problem of approximate mathematical expressions, the parsed input can also be used to produce numerical evaluations. In this scenario, both the answer key and the student's response can be viewed as functions over a possibly multi-dimensional domain. Then, a handful of points can be selected from this domain, and both the answer key and student's response can be evaluated at each of those points. If all the evaluations match within a specified tolerance, the response can be marked correct.

Figure 3:
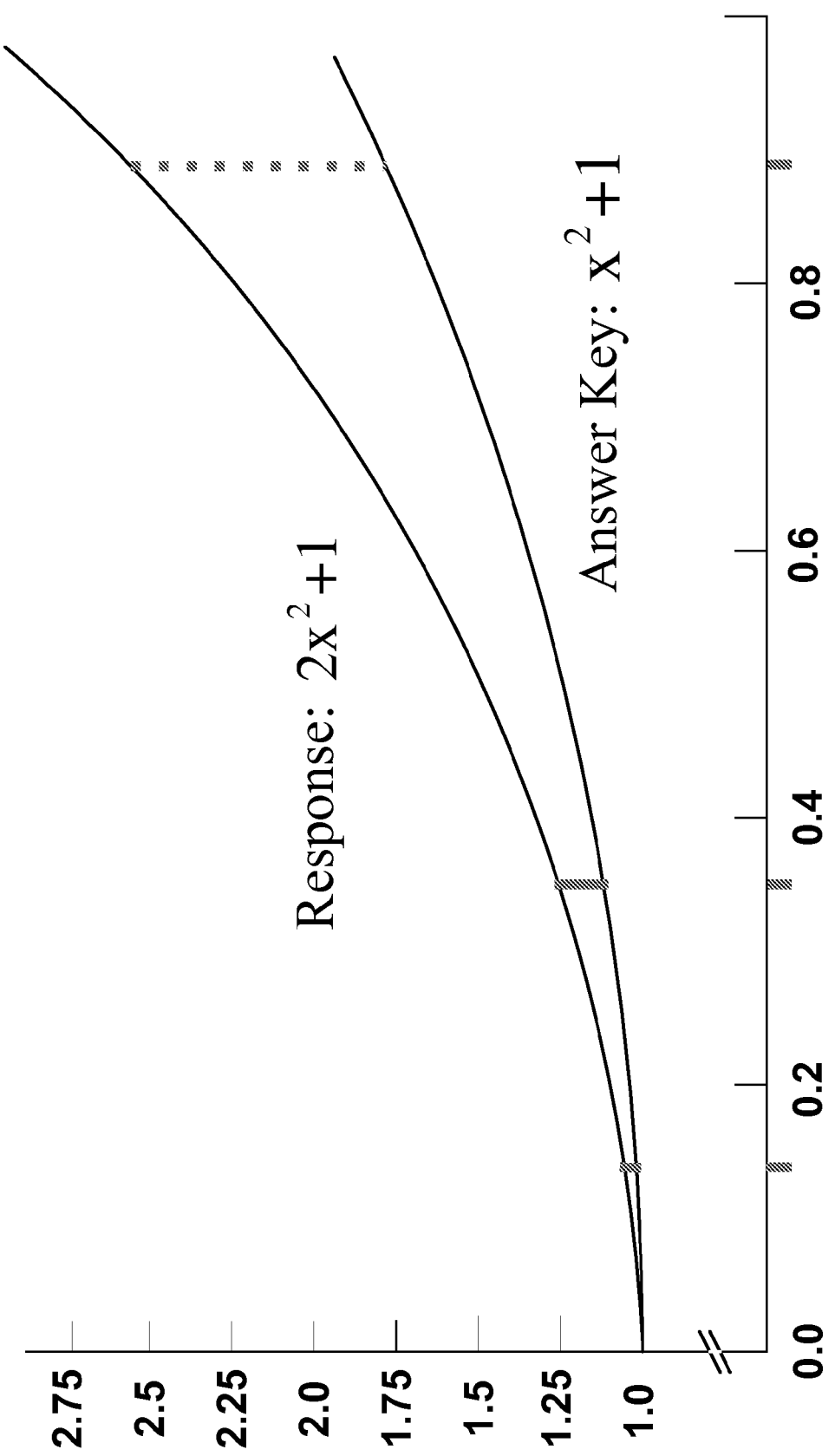
FIG. 3 illustrates an embodiment of a process to deal with the problem of approximate mathematical expressions by using the parsed input to produce numerical evaluations over a 1-dimensional domain, where the points chosen for this exemplary evaluation are x=0.1235, 0.3457, 0.8901.

FIG. 3 illustrates this process over a 1-dimensional domain, where the points selected for evaluation are x=0.1235, 0.3457, 0.8901. In this example, the response would be marked incorrect because the third response evaluation differed from the third key evaluation by more than the specified tolerance. This numerical approach has the advantage that any equivalent expression the student enters, no matter how strangely formatted, will always be accepted.

The grading methods presented herein can be applied in the event of an ambiguous input. For example, in the algebra scenario, a grading method can be applied multiple times; using the variables "response1," "response2," . . . to represent each possible response interpretation. Then the results of all these programs can be combined using logical "or" statements. In this way, the system can assess all interpretations before announcing a failure. A similar approach can be utilized when numerically evaluating responses.

Figure 4:
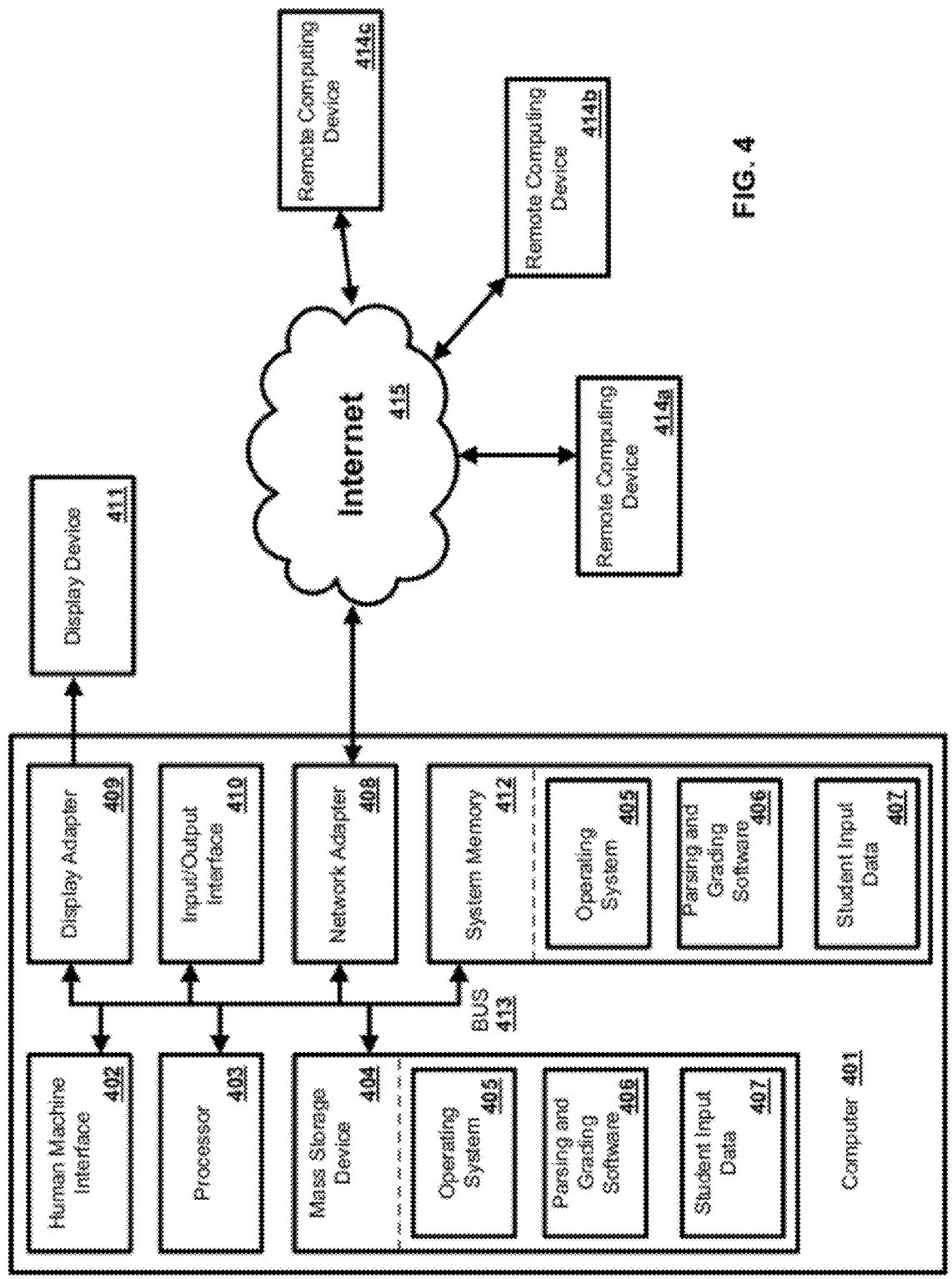
FIG. 4 is a block diagram illustrating an exemplary operating environment for performing the disclosed methods.

One skilled in the art will appreciate that provided is a functional description and that the respective functions can be performed by software, hardware, or a combination of software and hardware. In an aspect the methods and systems can comprise parsing and grading software 406 as illustrated in FIG. 4 and described herein. In an exemplary aspect, the methods and systems can comprise a computer 401 as illustrated in FIG. 4.

FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 401. The components of the computer 401 can comprise, but are not limited to, one or more processors or processing units 403, a system memory 412, and a system bus 413 that couples various system components including the processor 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description can also be implemented over a wired or wireless network connection and each of the subsystems, including the processor 403, a mass storage device 404, an operating system 405, parsing and grading software 406, student input data 407, a network adapter 408, system memory 412, an Input/Output Interface 410, a display adapter 409, a display device 411, and a human machine interface 402, can be contained within one or more remote computing devices 414a,b,c at physically separate locations, connected through buses of this form, in effect implementing a fully distributed system.

The computer 401 typically comprises a variety of computer readable media. Exemplary readable media can be any available media that is accessible by the computer 401 and comprises, for example and not meant to be limiting, both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as student input data 407 and/or program modules such as operating system 405 and parsing and grading software 406 that are immediately accessible to and/or are presently operated on by the processing unit 403.

In another aspect, the computer 401 can also comprise other removable/non-removable, volatile/non-volatile computer storage media. By way of example, FIG. 4 illustrates a mass storage device 404 which can provide non-volatile storage of computer code, computer readable instructions, data structures, program modules, and other data for the computer 401. For example and not meant to be limiting, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and parsing and grading software 406. Each of the operating system 405 and parsing and grading software 406 (or some combination thereof) can comprise elements of the programming and the parsing and grading software 406. Student input data 407 can also be stored on the mass storage device 404. Student input data 407 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 401 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 403 via a human machine interface 402 that is coupled to the system bus 413, but can be connected by other interface and bus structures, such as a parallel port, game port, an IEEE 1394 Port (also known as a Firewire port), a serial port, or a universal serial bus (USB).

In yet another aspect, a display device 411 can also be connected to the system bus 413 via an interface, such as a display adapter 409. It is contemplated that the computer 401 can have more than one display adapter 409 and the computer 401 can have more than one display device 411. For example, a display device can be a monitor, an LCD (Liquid Crystal Display), or a projector. In addition to the display device 411, other output peripheral devices can comprise components such as speakers (not shown) and a printer (not shown) which can be connected to the computer 401 via Input/Output Interface 410. Any step and/or result of the methods can be output in any form to an output device. Such output can be any form of visual representation, including, but not limited to, textual, graphical, animation, audio, tactile, and the like.

The computer 401 can operate in a networked environment using logical connections to one or more remote computing devices 414*a,b,c*. By way of example, a remote computing device can be a personal computer, portable computer, a server, a router, a network computer, a peer device or other common network node, and so on. Logical connections between the computer 401 and a remote computing device 414*a,b,c* can be made via a local area network (LAN) and a general wide area network (WAN). Such network connections can be through a network adapter 408. A network adapter 408 can be implemented in both wired and wireless environments. Such networking environments are conventional and commonplace in offices, enterprise-wide computer networks, intranets, and the Internet 415.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of parsing and grading software 406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 5:
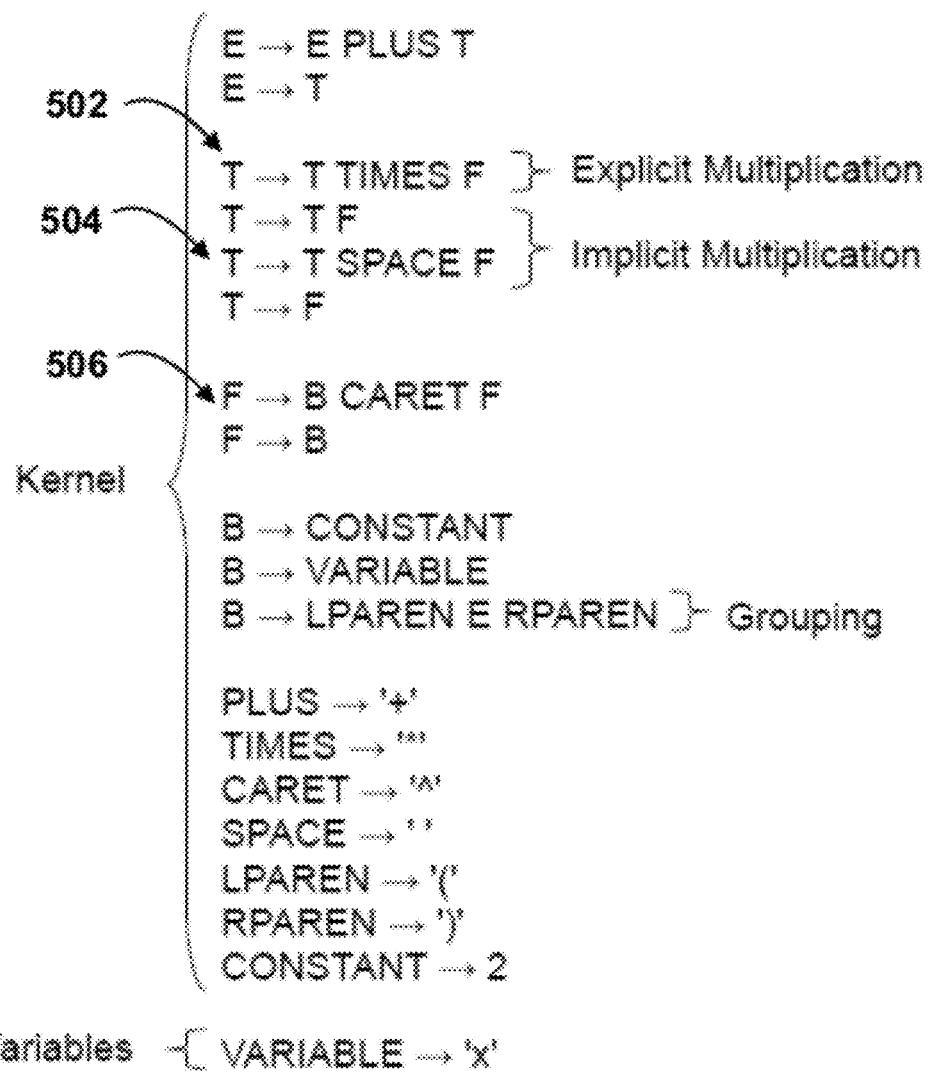
FIG. 5 is an exemplary grammar for a mathematical expression with implicit multiplication.

FIG. 5 illustrates a grammar 500 for an arithmetic expression. However, it is understood that the grammar 500 can be modified for other fields beyond arithmetic, as appreciated by one skilled in the art.

The grammar of a typical programming language, like the C programming language, typically requires the use of an explicit multiplication expression. For example, "2*x" is preferred over the mathematically acceptable "2x". However, when grading a student's mathematical response against a given answer key, it is possible to construct a grammar which allows implicit, as well as explicit multiplication, as long as the list of variable names to be expected in the response are known ahead of time. For example, if the answer to a homework question was "x^2", then the list of variable names to be expected in the response would be ['x'].

As shown in FIG. 5, the grammar 500 can comprise representations of natural math notations typically found in textbooks. For example, the grammar 500 includes an explicit multiplication expression 502 and an implicit multiplication expression 504. A production 506 defines the factor "F" as an expression without addition or multiplication in it, and allows the traditional caret character for notation of powers. It is understood that the explicit multiplication expression 502 and the implicit multiplication expression 504 can be written to represent any explicit or implicit expression having any format. Accordingly, the grammar 500 provides a flexible, expressive, and necessarily ambiguous representation of various structures such as arithmetic expressions, for example.

In certain aspects, the grammar 500 can be generated by augmenting a static, or "kernel" grammar with zero or more variable productions, each corresponding to a name in the list of expected variable names. For example, according to the grammar 500, unusual responses like "xx" can be interpreted as implicit multiplication, and can therefore be accepted for an answer of "x^2".

Figure 6:
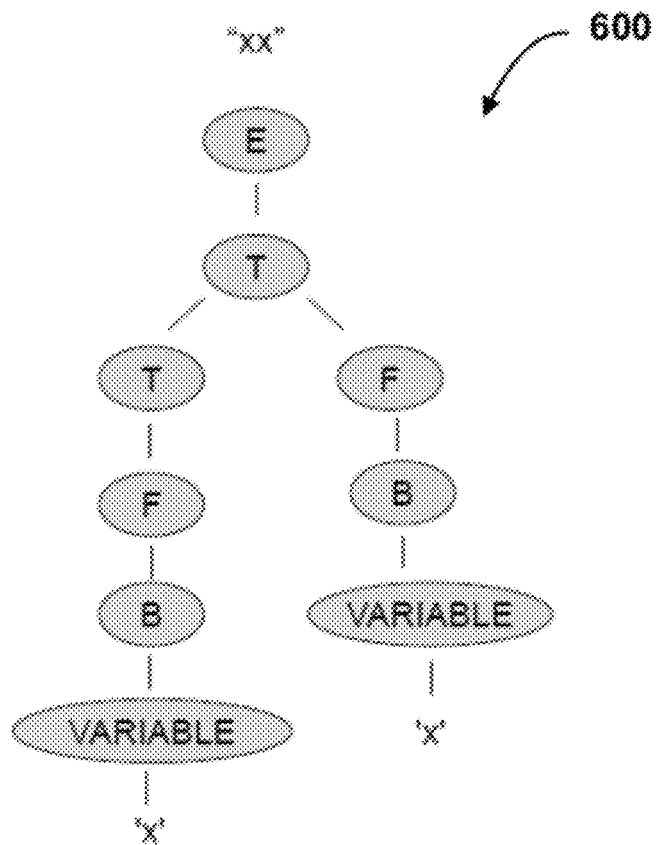
FIG. 6 is a syntax tree for the expression "xx"
Figure 7:
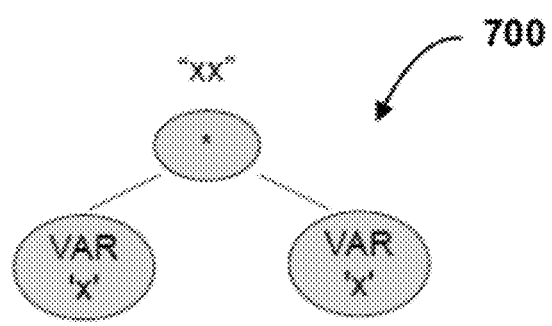
FIG. 7 is an operator tree for the expression "xx"

As an illustrative example, FIG. 6 illustrates a full syntax tree 600 for an input of "xx". Full syntax trees like the one shown in FIG. 6 are useful for understanding the possibilities inherent in a grammar such as the grammar 500. However, full syntax trees do not need to be explicitly maintained during a parsing process. Accordingly, it can be useful to compress the full syntax tree 600 into an operator tree 700, as shown in FIG. 7. As an example, the operator tree 700 can comprise a plurality of node types, such as '*' for multiplication, wherein the operator tree 700 can then be used for evaluation.

The functional notation typically accepted by computer systems uses parentheses to explicitly denote arguments to functions, e.g. "sin(x+2)*2" Accordingly, the basic math expression grammar is augmented with productions allowing both explicit and implicit function application. If the expression sin(x+2)*2 were evaluated for a given value of 'x', basic rules of arithmetic first concentrate on the parenthesized group (x+2). The number 2 can be added to the value of 'x', and the result can be stored. Then the sine function is applied to the result, the output of the sine function multiplied by 2. This sequence shows that in the order of operations, function application comes directly after grouping with parentheses. Therefore, when productions allowing function application are added, they can derive the same grammar symbol as the production used for grouping. As an example, another production for the grammar symbol B can be added to the grammar 600, as follows:

B→FNAME LPAREN E RPAREN
FNAME→'s' 'i' 'n'.

However, this approach makes use of parentheses. In traditional math notation, the argument to a function can often be deduced without the use of parentheses, as in the following example:

"sin x".

In this case, the argument is clearly 'x', even though there are no parentheses explicitly delimiting it. Eliminating the requirement of parenthesized function arguments leads to the possibility of other, more unusual notations, which can still be best interpreted in only one way. Consider the following example:

"sinx".

The only interpretation that makes sense is that we are taking the sine of 'x'.

Indeed, there is no variable called 'sinx', so interpreting the input as a single variable is impossible. Furthermore, the notion that the input could mean "sin*x", i.e. implicit multiplication between 'sin' and 'x', would make sense only if there was a variable called 'sin', which there is not.

When dealing with implicit function calls, the key realization is that there are two types of function application patterns. The first type employs the use of spaces between the function name and the argument, and the other type does not. The customary "sin(x)" notation can be viewed as the second type of function application pattern, since the function name 'sin' abuts the argument "(x)", with no space in between.

The real difference between these two types of functional application shows up in regard to implicit multiplication. In particular, imagine taking the input string for a given function call, and concatenating one extra character on the end, as shown in FIGS. 8A-8B.

Figure 8A:
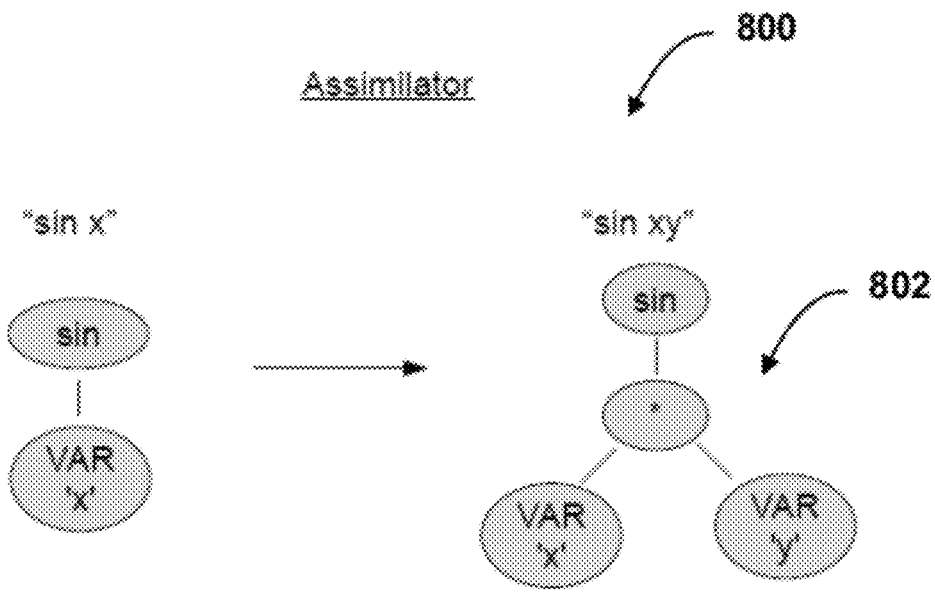
FIG. 8A shows operator trees for an assimilator function call.

FIG. 8A illustrates an operator tree 800 for an assimilator 802 or a function call that cannot be implicitly multiplied onto from the right. As an example, if a user enters extra elements directly to the right of the assimilator 802 style function call, the extra elements can all be assimilated into the argument of the function.

Figure 8B:
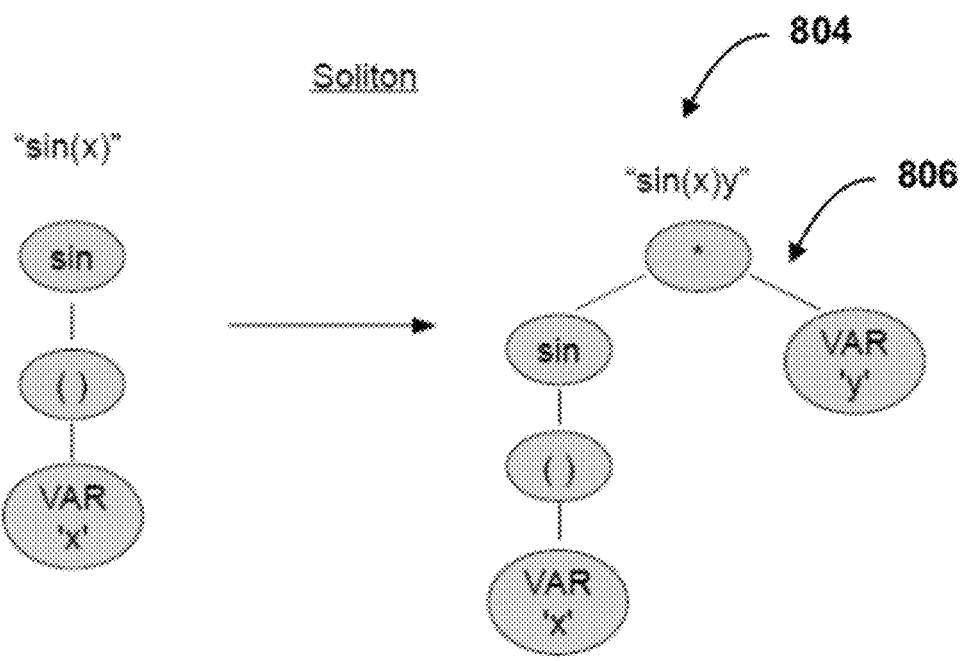
FIG. 8B shows operator trees for a soliton function call.

FIG. 8B illustrates a syntax tree 804 for a soliton 806 or a function call that can be implicitly multiplied onto from the right. As an example the soliton 806 function call does not change as additional elements get implicitly multiplied onto it from the right.

Figure 9A:
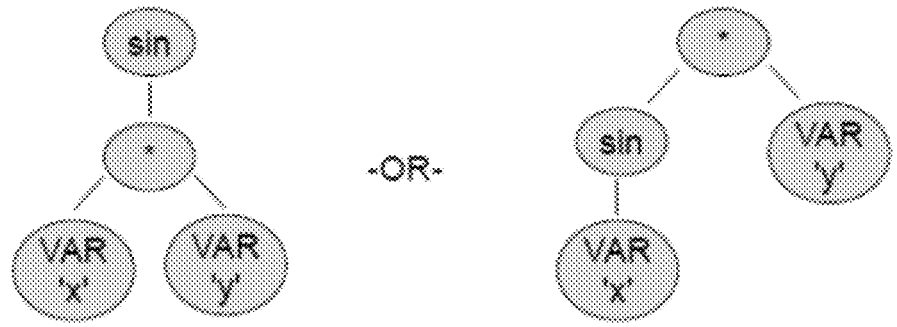
FIG. 9A shows operator trees for the expression "sin x y"
Figure 9B:
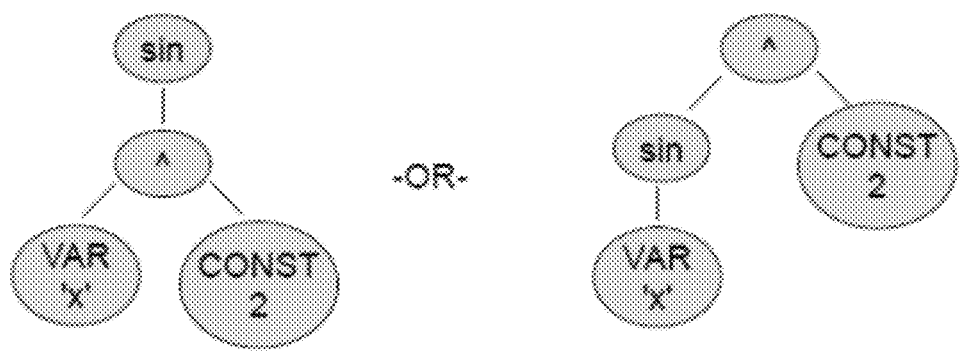
FIG. 9B shows syntax trees for the expression "sin x^2"

When two types of function calls are allowed, the possibilities for ambiguity abound. As the following example shows, an assimilator-style function call can be followed by a space, and then by another factor, creating two valid interpretations, as shown in FIG. 9A. A similar situation can occur when a soliton function call is followed by a caret and another factor, as illustrated in the example shown in FIG. 9B.

In order to allow "good" mathematical notation, commonly found in textbooks, the methods and systems provided can process bad, or ambiguous notation. The grammar can provide unambiguous parses when the assimilator 802 and soliton 806 patterns are used correctly, but can also provide all or a substantial portion of the possible interpretations when the patterns are used ambiguously. This can be done by augmenting the basic math expression grammar with productions deriving the grammar symbol B. The first new production can allow for the assimilator 802 pattern of function application, and the second can allow for the soliton 806 pattern, as follows:

B→FNAME SPACE T (assimilator)
B→FNAME F (soliton).

The assimilator 802 pattern can accept any term T as an argument, but the soliton 806 pattern takes as argument a single factor F. This distinction means that any multiplications directly following the assimilator 802 style function call can be taken "into the argument" since the product of all the multiplications can by viewed as a single term T. However, multiplications following the soliton 806 function application will be taken "on the outside," since the argument factor F can not be a product, by definition.

As an example, "sin x" can be defined as an assimilator 802 function call. Subsequently, the "sin x" function call can also be understood as some term T. Thus, it can be used as the argument of another assimilator 802 style function call, as in the following example:

"sin sin x".

As more clearly shown in FIG. 10, an expression added to the right of an assimilator function call can be properly processed by splitting each of the grammar symbols B, F, and T into subsymbols, based on whether the expressions the grammar symbols derive can be implicitly multiplied onto from the right or not. Sub-symbols deriving expressions which cannot be implicitly multiplied onto from the right can be named with the suffix "_a", for an assimilator function call, and sub-symbols deriving expressions which can be implicitly multiplied onto from the right can be named with "_s", for a soliton function call. It is understood that any symbol or sub-symbol can be used to represent any function call.

FIG. 11 illustrates an exemplary grammar 1100 including representations of natural math notations such as explicit and implicit function expressions. As shown, the grammar 1100 can comprise an explicit multiplication expression 1102 and an implicit multiplication expression 1104. The grammar 1100 can also comprise an assimilator sub-symbol 1106 and a soliton sub symbol 1108 for representing an implicit function expression. As a non-limiting example, the implicit function expression can be defined in terms of an interaction with the implicit multiplication expression. It is understood that the explicit multiplication expression 1102 and the implicit multiplication expression 1104 can be written to represent any explicit or implicit expression having any format or grammar structure. It is further understood that the assimilator sub-symbol 1106 and the soliton sub symbol 1108 can be configured to represent any function (arithmetic or not) having any format or grammar structure. Accordingly, the grammar 1100 provides a flexible, expressive, and ambiguous representation of various structures such as arithmetic expressions, for example.

Figure 12:
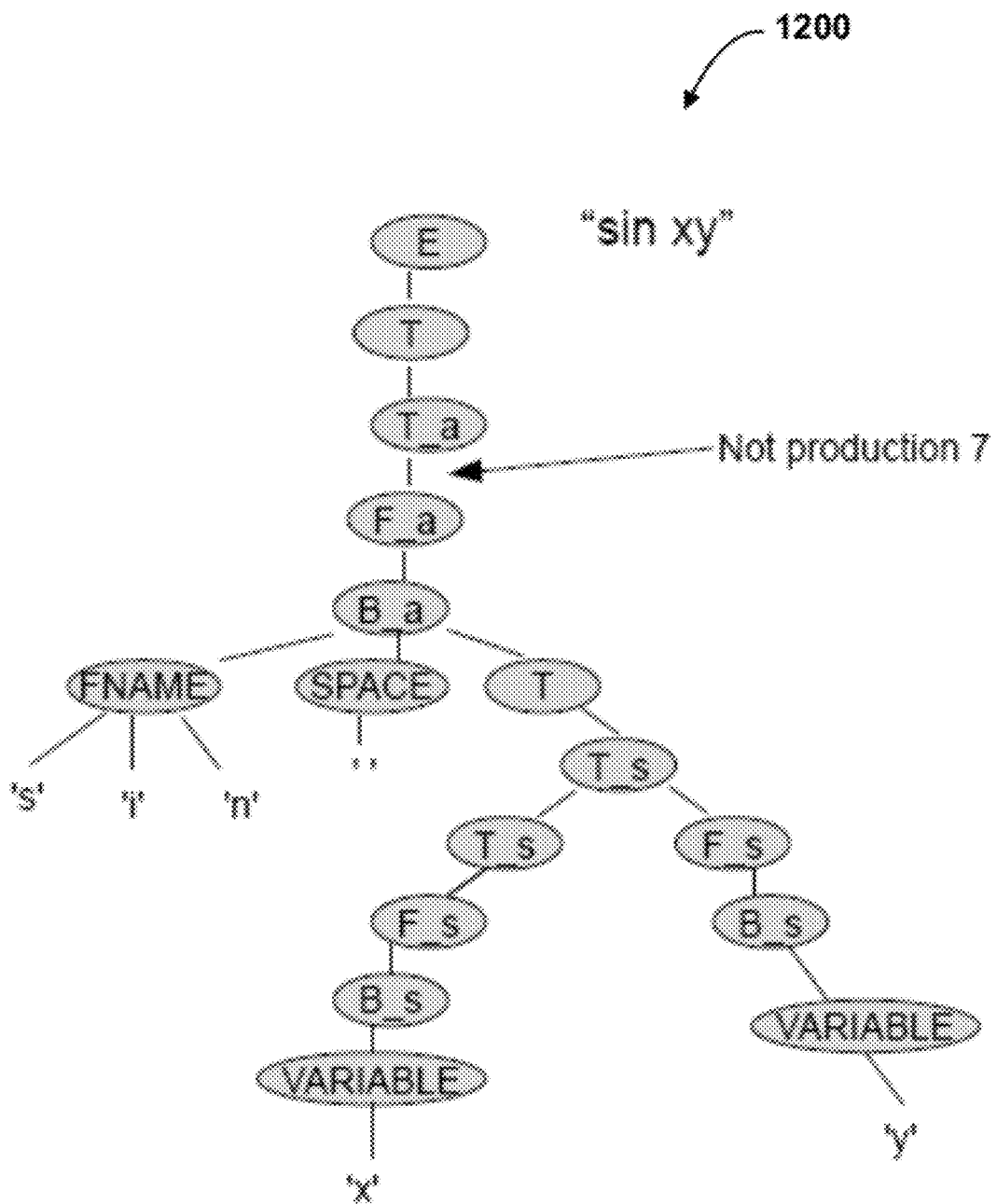
FIG. 12 is a syntax tree for the expression "sin xy"

FIG. 12 illustrates a parse tree 1200 based upon the grammar 1100 of FIG. 11. In this example the production 7 (T_a→T_s F_a) was not used in the third reduction. If production 7 had been used instead of production 8, the input would be viewed as a multiplication between "sin x" and "y". Production 7 can not be used because it would be necessary to derive the substring "sin x" from the grammar symbol T_s, and the substring "y" from the grammar symbol F_a. Neither of these derivations are possible, so production 8 was used in the third reduction.

Figure 13:
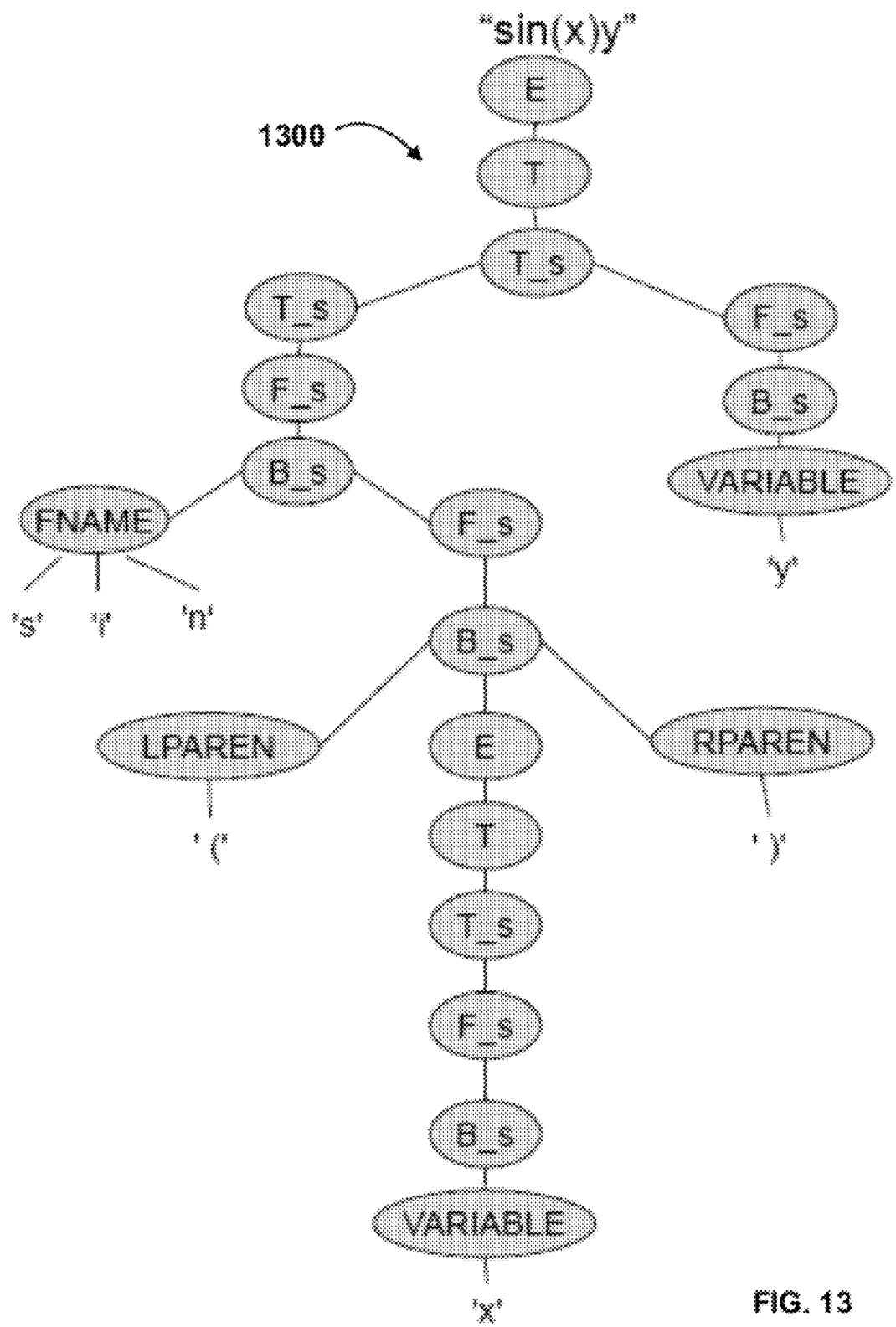
FIG. 13 is a syntax tree for the expression "sin (x) y"

FIG. 13 illustrates a parse tree 1300 based upon the grammar 1100 of FIG. 11.

This example shows the use of the soliton 806 function application pattern. This input is unambiguous because at each stage in the derivation, there is only one possible production that can be used.

Figure 14:
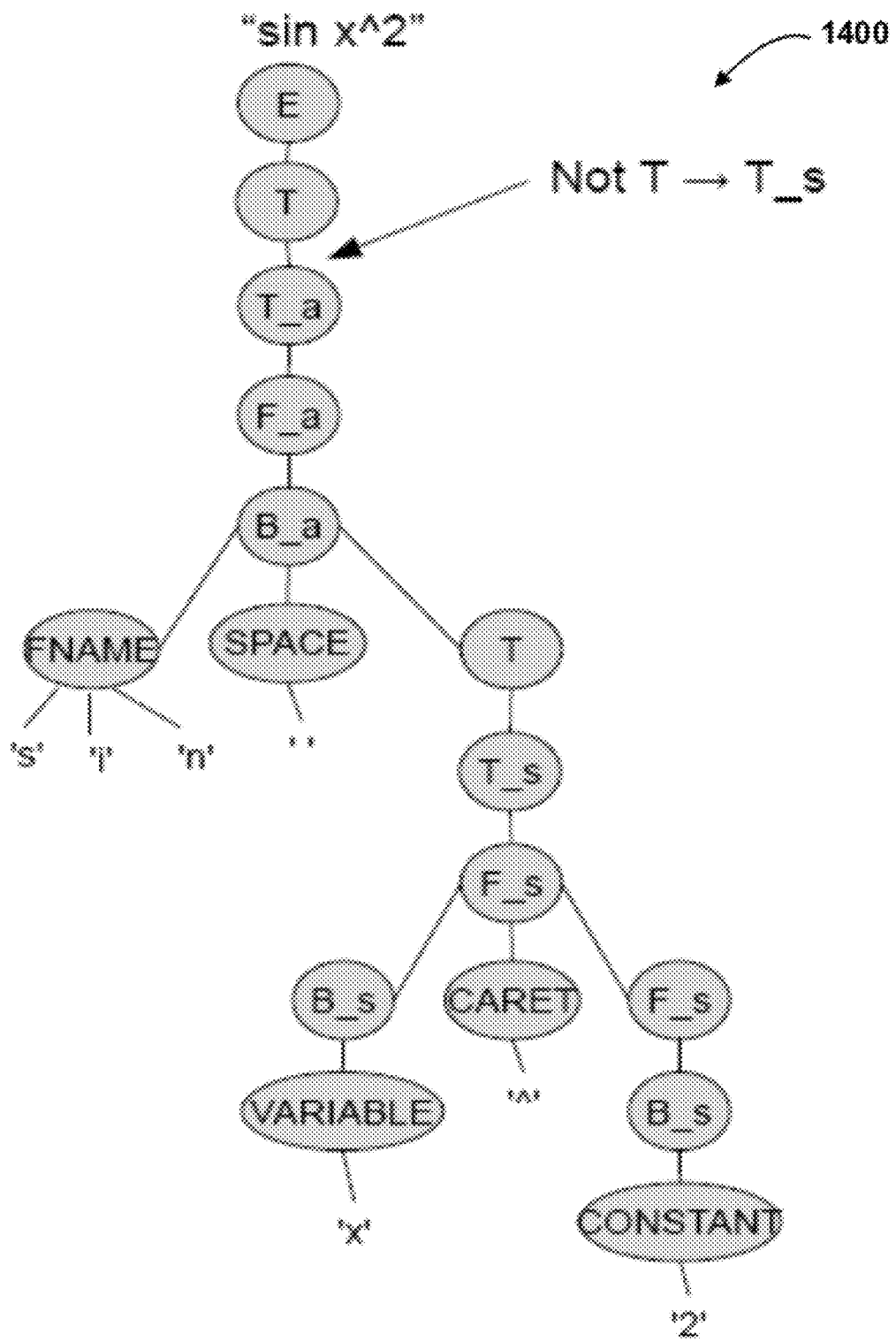
FIG. 14 is a syntax tree for the expression "sin x^2"

FIG. 14 illustrates a parse tree 1400 based upon the grammar 1100 of FIG. 11. This example shows one point in the derivation where production 3 (T→T_a) was used instead of production 4 (T→T_s). The only way the input could be understood as a T_s is if "sin" could be understood as a term. Since there is no variable called 'sin', the substring "sin" cannot be a term by itself, and hence production 4 can not be used to derive the input.

Figure 15:
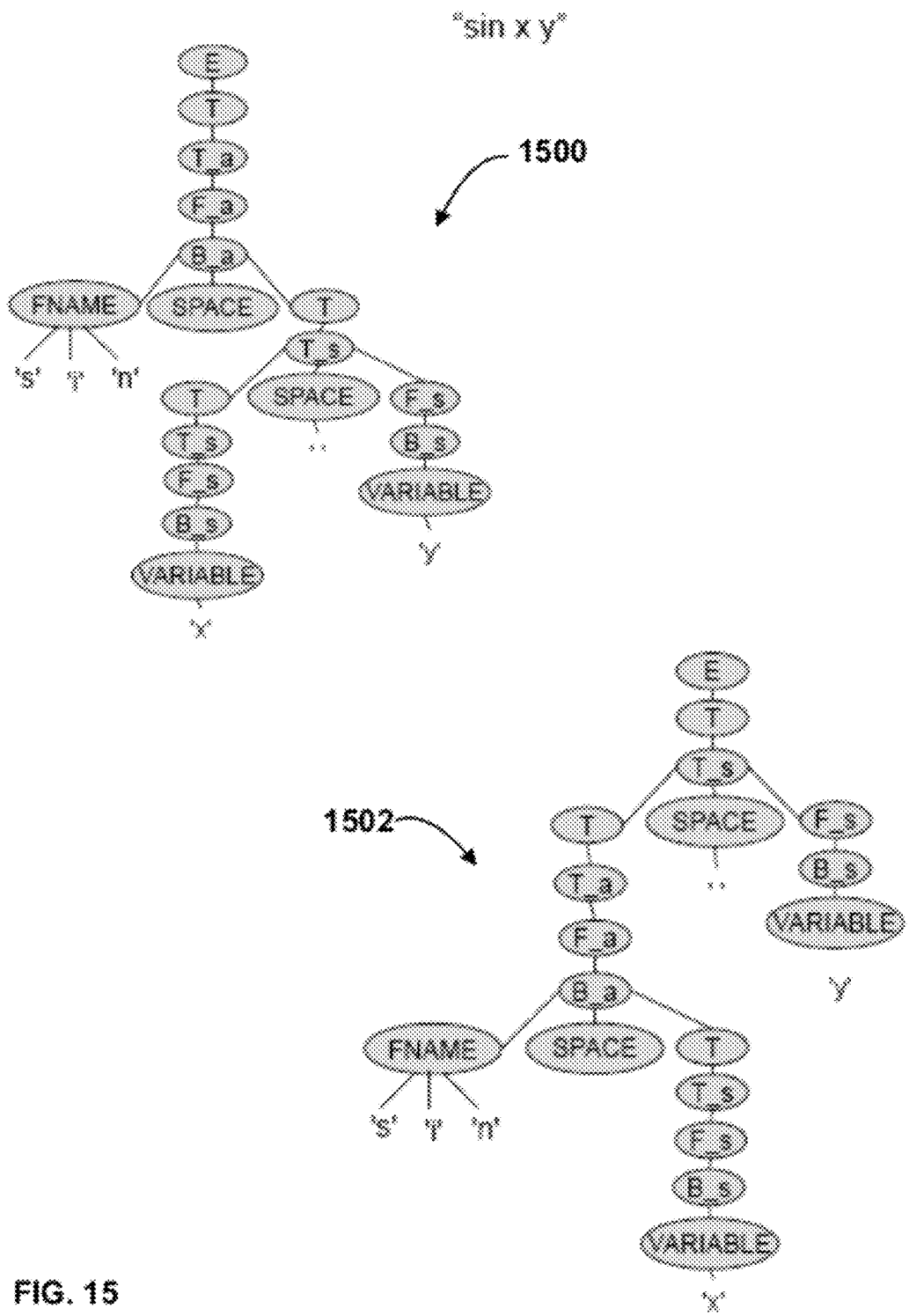
FIG. 15 shows a pair of syntax trees for the expression "sin x y"

FIG. 15 illustrates a pair of parse trees 1500, 1502 based upon the grammar 1100 of FIG. 11. This last example shows the behavior of the grammar in the case of an ambiguous input. In this derivation, the first T can be expanded as either a T_a or a T_s, so both parses are valid.

In certain aspects, it can also be verified that when the input "sin sin xy" is parsed with the grammar 1100, the 'y' is assimilated into the innermost function's argument, as desired. The grammar 1100 is designed so that the most commonly used and accepted notations are unambiguous. In the case of ambiguous inputs, the resulting parse trees are significantly different from each other. Therefore, the probability that their respective mathematical expressions are equivalent is very low. An extended version of this grammar can become a general framework for parsing textbook mathematical notation.

In a further aspect, when parsing mathematical notation, it is sometimes desired to interpret an unrecognized sequence of characters as the name of some unknown variable. This introduces ambiguity, however, and extra mechanisms must be introduced to eliminate spurious parses.

A method has been shown for building custom mathematical grammars, based on expected variable names, for each answer entry performed in a grading system. However, keeping in mind that students answering homework questions may sometimes get confused, it is reasonable to assume that they will sometimes enter variables which are not expected, but are still mathematically valid.

For example, imagine that a physics question is asking for an expression in 'x', such as "x^2", but the student enters an expression in 't', like "2t". This indicates a lack of understanding about the quantities being modeled (position vs. time) and should be marked wrong. This is different than a mathematically invalid input, like "*(2+", which would should not even parse.

Another scenario comes about when a student uses an unexpected variable name in a correct answer. For example, if the answer is "x+2" and the list of expected variable names is ['x'], then a response of "x+t+2−t" should still be accepted (the t's cancel out). These examples suggest a means of making unknown variable names "legal" in the grammar, while still giving preference to the known variable names. In an aspect, productions for unknown variables can be added directly into the grammar. These productions can accept any sequence of letters, with letters being defined as the following:

letters=(OPS∪SPACES∪DIGITS)$^C$, where OPS={''', '*', '!', '/', '+', '−', '.', '(.)', '_', '.'},

SPACES={' '}, and DIGITS={'0', '1', '2', '3', '4', '5', '6', '7', '8', '9'}.

A single letter can be recognized not only as part of a variable name, but part of an unknown quantity as well. For example, in a grammar which recognizes the known variable 'alpha', as well as the possibility of unknown variables, a plurality of productions 1600 can be generated, as shown in FIG. 16.

As shown in FIG. 16, the letter 'a' matches the right hand side of the "L→letter" production, as well as the production "La→a". These productions can be used with a bottom-up prediction strategy in a chart parsing algorithm such as the one described in Martin, J. H., & Jurafsky, *Speech and language processing* (2nd ed.) Upper Saddle River, New Jersey: Pearson/Prentice Hall (2009), hereby incorporated herein by reference in its entirety. The main loop of the chart parser can scan the input one character at a time, and enter states into an agenda based on the singleton productions of the grammar. Each individual character can become a token with type 'letter', and data containing the actual character value, e.g. {type=>'letter', data=>'a'}. The parser can identify any singleton production whose right hand side matches either the token's data, or the token's type. A state can be created, with copies of the token's information, for each of these productions. These new states will be added to the agenda and marked as complete. For example, when 'alpha' is a known variable name, the scanning the letter 'a' would cause the following two states to be entered into the agenda:

1) La→a.
2) L→letter.

Using productions such as these, an un-altered chart parser can eventually understand an input of 'alpha' as both a single variable (by spelling out La, Ll, Lp, Lh, La), and as an unknown (by repeatedly concatenating L's together).

The method of recognizing unknown quantities outlined above could return many spurious parses when used with an un-altered chart parser for mathematical notation. For example, if the list of expected variable names is ['al', 'lp', 'pa'], and an input of "zalpay" is parsed, a plurality of interpretations can be generated, as shown in FIG. 17.

In the example illustrated in FIG. 17, the first two interpretations have a mixture of known V's and unknown U's, whereas the third interpretation consists entirely of unknowns. In certain aspects, the parser can exclude the spurious third interpretation from the set of parses returned by altering the general chart parsing algorithm in the following manner:

1) [Priority Score] Assign to each partial parse a priority score of 3, 2, or 1, depending on whether it consists entirely of known quantities, a mix of knowns and unknowns, or entirely unknown quantities, respectively;
2) [Order the Agenda] Keep the states in the agenda ordered by their priority score, so that the states with the highest priority score get processed first; and
3) [Don't Complete Outranked States] Assuming a complete state has been popped from the agenda, check to make sure no other complete states covering the same substring of input have a higher priority score. If so, abandon work on the popped state.

As an example, when a chart parser pops a complete state from an agenda, the parser can extend 0 or more partial parses by attaching the complete state to the appropriate open slot in some partial parse tree. A marker can then be incremented to show the next open slot of the newly extended state, and the result can be added to the agenda, as shown in FIG. 18.

During the extension process, if each partial parse already has a priority score associated with it, then the priority score of the new state can be computed using the current priority score, and the priority score of the complete state being used as an extension, as shown in FIG. 19. In the example illustrated in FIGS. 18-19, the partial parse consisted of all known quantities, so it had a score of 3. However, when the partial parse was extended to included an unknown, the partial parse became a mix of known and unknown quantities, and was assigned a priority score of 2. The desired output of the priority score function can be calculated based upon the following equation:

$$new\_score = floor(\tfrac{1}{3}*(extendee\_score + extension\_score - 1) + 1.5).$$

In this way, new priority scores can be computed each time a state gets extended, but the states can obtain initial priority scores from the grammar itself. Singletons like "La→a" get a priority score of 3, since they will be used when spelling out a known variable name. However, the singleton "L→letter" gets a priority score of 1, since the singleton "L→letter" can be used to construct unknowns. Furthermore, whenever a predicted state gets added to the agenda, it can take the same priority score as the completed state which triggered the predicted state. However, other equations can be used.

With these measures in place, every state in the agenda can have a priority score, and the agenda can be ordered. Specifically, the states in the agenda can be organized in tiers, by priority score. If the highest priority score of any state in the agenda is 3, then all the states with a priority score of 3 can be processed before any others.

The completion of outranked states can be prevented, as long as all the previously completed states are organized by priority score and by the substring. If a particular state is not outranked by any other completed state covering the same substring of input, then it can be completed and added to the chart. Due to the ordering of the agenda, if there was the possibility of a higher ranking state for the same substring of input, it would have been processed and added to the chart already.

A Chart parser with these modifications, using the specified grammar, can be a practical tool for parsing mathematical notation, even in the face of unknown variable names.

In certain aspects, the mathematical objects represented by a key and a response can be compared algorithmically. For example, if the mathematical objects represented by the key and the response are scalar quantities (e.g. not vectors), an effective way of comparing the key and the response is by using numerical evaluations. Both the key and the response are evaluated at specific values in the domain. The results can be compared using numerical tolerance. In order to compare the results using numeric tolerance, a common domain can be established, over which both the key and response can be tested. For example, if the answer key is:

key: "a+2"

and the response is:

response: "a+t+2−t"

then the common domain is {a X t}.

The two-dimensional domain is a set of ordered pairs, each comprising a value to be substituted in for 'a', and a value to be substituted in for 't'. As an example, the parsing process tracks all variants (knowns and unknowns) encountered in the input and the common domain for a given pair of mathematical objects can be computed by taking the union of the set of variants in the key object and the set of variants in the response object. The resulting unique variable names can become the dimensions of the common domain.

Figure 20:
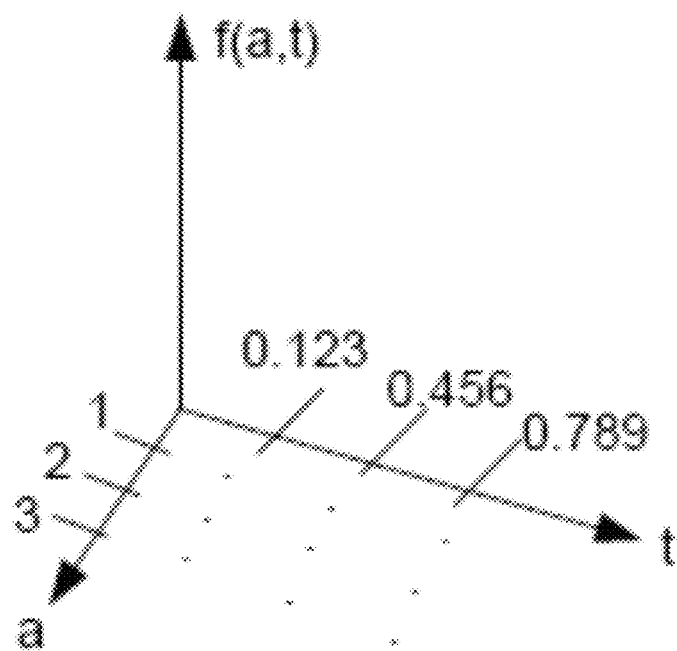
FIG. 20 is a representation of a set of ordered pairs.

Now, for each dimension in the common domain, a finite set of values that can be substituted in for that variable can be decided upon. Experience has shown that decimal numbers between 0 and 1 are often appropriate. However, the ability to specify exactly which numbers each variable should take on is also needed. For example, in the domain {a X t}, the variable 'a' could be made to assume values from the set {1, 2, 3}, and 't' could assume values from {0.123, 0.456, 0.789}. This setup can produce a set of ordered pairs as illustrated in FIG. 20.

Considering the first ordered pair in the domain, 1 can be substituted for 'a', and 0.123 for 't', into the response expression "a+t+2−t", and evaluated to obtain a number. The same can be done for the key expression "a+2", even though it is constant in 't'. Now, the two numerical evaluations can be compared. If the two evaluations do not agree to within a specified tolerance, a result of INCORRECT can be returned immediately. Favorable results have been achieved with a specified tolerance of 0.001 across a variety of grading instances. However, the tolerance value can be configured for each individual grading instance, if needed. Assuming the first two evaluations agreed to within tolerance, the next ordered tuple from the domain can be generated, and the process repeated in a loop. Only after each of the evaluations specified in the domain have been successfully compared will a result of CORRECT be returned.

There is no way to guarantee that each ordered tuple in the domain will produce an acceptable evaluation in both the key and the response. Indeed it is possible that some expressions may produce errors, such as "divide by zero," when evaluated at certain numbers. Accordingly, in an aspect, the comparison loop can be made to skip over any ordered tuple in the domain which produces an error either in the key or in the response. Furthermore, a counter can store the number of valid comparisons that were actually made, and can be incremented after each successful comparison in the loop. At the end of the comparison loop, if the number of successful comparisons is nonzero, a result of CORRECT can be returned. Otherwise, either the response or the key produced an error for every single ordered tuple in the domain, and so a result of INCORRECT can be returned.

This system of comparison can accept a scalar expression of any form whatsoever, and return a result of CORRECT if the expression is mathematically equivalent to the key. The system of comparison also has the ability to accept responses that are approximately equal to the key, due to the use of numerical tolerance around each evaluation.

Once a method for comparing scalar expressions is established, multi-element expressions (sets), can be graded by applying the scalar method multiple times. For example, if the answer is the set key: "{x, t, x+t}" and the response is the set response: "{t, x, 2x}" then the mathematical definition of set equality can be checked in the following way: 1) Verify that each element in the response matches some element in the key; 2) Verify that each element in the key matches some element in the response.

The elements of each set are assumed to be scalar expressions, so in order to determine whether a given pair of elements "match," the method of numerical evaluations can be used as provided herein. Furthermore, feedback can be generated to demonstrate which of the response elements were found to match the key, and which were not. For the key and response given above, the system can generate a feedback 2100, shown in FIG. 21.

The generated feedback can use a slightly altered version of the student's input ("2*x" instead of "2x"). This notation explicitly and unambiguously represents the mathematical object obtained from parsing the student's original input.

In the example provided, the response provided by the student/user was marked INCORRECT. However, 2 out of 3 elements in the response were correct when compared to the key. The notion of partial credit can be utilized when dealing with ambiguous inputs. If a response is ambiguous, but every single interpretation is still wrong, then the system can grade every interpretation before returning a result of INCORRECT. Thus, if there was a deterministic way of assigning partial credit to each parse, the system could pick an interpretation which received the highest partial credit score, and give feedback to the user accordingly. In this way, the system can guide the user toward the correct answer, without revealing the answer. This can reinforce good notational habits, since the generated feedback uses unambiguous notation when echoing back the student's input.

In an aspect, provided are methods for assessing partial credit utilizing a calculation of the ratio of the number of correct elements out of how many elements were expected, as in the following formula:

$$\text{partial\_credit} = \frac{nk}{Nk}.$$

where
nk=number of key elements found in response, and
Nk=total number of key elements.

A complication can occur if the response contains a particular key element more than once. With the definition above, the first occurrence of that element would increment 'nk', and the second occurrence would increment 'nk' again. This means that for some responses, 'nk' could be larger than 'Nk', and students could "game the system." For example, if the student only knew one element of the required key, they could enter a response consisting of this one element repeated as many times as necessary, eventually gaining full credit for the question. The following modification to the partial credit formula addresses this problem:

$$\text{partial\_credit} = \begin{cases} \frac{nk}{Nk}, & nk < Nk; \\ \frac{nk}{Nk + Nr - nr}, & \text{otherwise} \end{cases}$$

nk=number of key elements found in the response,
Nk=total number of key elements,
nr=number of response elements found in the key, and
Nr=total number of response elements.

Here, the quantity "Nr−nr" represents the number of extra elements in the response, and it is utilized in the example grading process illustrated in FIG. 22.

The partial credit formula can be used to decide which interpretation to report when grading ambiguous responses. However, as the student enters more and more copies of one correct element, the student's partial credit score approaches, but never actually reaches, the number 1. Accordingly, the final result returned by the grading system can be CORRECT if partial credit is exactly 1, and INCORRECT otherwise.

FIG. 23 illustrates an example of an ambiguous student input through the entire parsing and grading process, complete with feedback generation. As shown, the ambiguity here was caused by the ability to use commas within large numbers, as well as to separate elements of a set. However, the partial credit rubric kept the feedback focused on the interpretation that made sense in the context of the question. The methods described herein can be used to grade a large number of mathematical questions, in a robust and reliable way.

Figure 24:
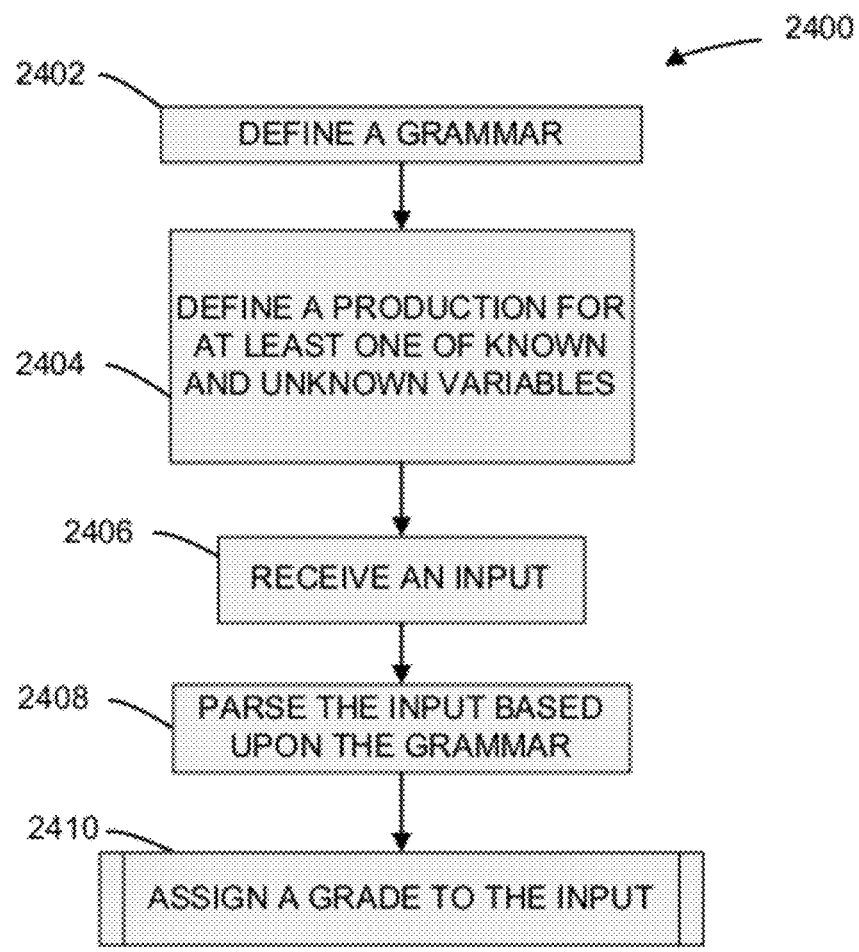
FIG. 24 is a schematic flow diagram of a method for freeform parsing and grading.

FIG. 24 illustrates a method 2400 of freeform parsing and grading. FIG. 24 will be discussed with reference to FIG. 1 and FIG. 23. In step 2402, a grammar can be defined for an arithmetic expression. It is understood that other expressions can be represented by the grammar such as language, for example. As an example, the grammar can comprise an implicit multiplication expression and an implicit function expression such as the grammar 1100 illustrated in FIG. 11. In certain aspects, the implicit function expression is defined in terms of an interaction with the implicit multiplication expression. As a further example, the grammar is derived from a kernel grammar having a variable production corresponding to a pre-defined variable name. In an aspect, the grammar includes at least one of an assimilator expression defining a function application that assimilates elements from the right of the assimilator expression into an argument of an associated function and a soliton expression defining a function application that multiples elements from the right of the soliton expression to a result of an associated function.

In step 2404, a production can be defined in the grammar for at least one of known variables and unknown variables. As an example, the production can be defined in a manner similar to the process described herein, in reference to FIGS. 16-19.

In step 2406, an input can be received. As an example, the input can be a user-provided input representing a response to an arithmetic query. However, any inputs can be received. In step 2408, the input can be parsed based upon the grammar. For example the grammar can provide the executable instruction to generate a plurality of parse trees collectively defining the input. As a further example, a token can be defined to represent a partial parse of at least one of the parse trees, wherein the token includes a variable type and a variable data representing an actual character in the input. In certain aspects, a priority score is assigned to each of a plurality of partial parses of the input, based upon a number of known variables and a number of unknown variables included in each of the partial parses. As an example, each the partial parses is stratified in an agenda based upon the priority score of each of the partial parses and can be later processed based upon the stratification. As a further example, the priority score of at least a pair of the partial parses is compared to eliminate spurious ones of the partial parses.

In step 2410, a grade can be assigned to the input. As an example, the grade can be based upon a comparison of at least one of the parse trees against a key. As an example, the grade can be assigned based upon a set equality between the at least one of the parse trees and the key. As a further example, the grade is defined by a ratio of a number of elements in the key located in the input and a quantity defined by a sum of a total number of elements in the key and a total number of elements in the input less a number of elements in the input located in the key similar to the description regarding FIGS. 21-23.

Figure 25:
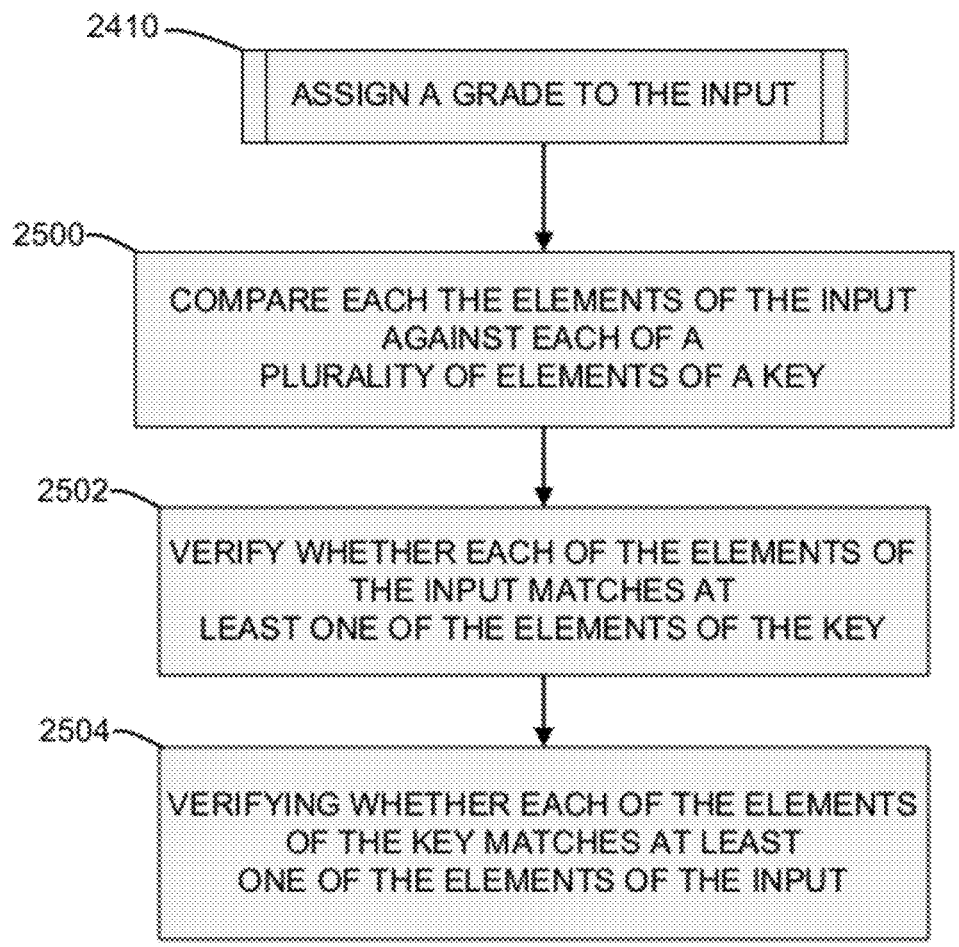
FIG. 25 is a schematic flow diagram of a subroutine for the method of FIG. 24.

FIG. 25 illustrates a subroutine 2410 of the method 2400. FIG. 25 will be discussed with reference to FIGS. 1-24. In particular, the step 2410 of FIG. 24 can be executed in a manner similar to the routine discussed below. In step 2500, each of the elements of the input can be compared against each of a plurality of elements of a key. In step 2502, a verification can be executed to determine whether each of the elements of the input matches at least one of the elements of the key. In step 2504, a verification can be executed to determine whether each of the elements of the key matches at least one of the elements of the input. Based upon the comparison and/or verification, a particular ratio or grade can be assigned to the input. As an example, a grade or partial credit can be assigned to input based upon the processes described herein, in reference to FIGS. 20-23.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respected. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims or inventive concepts.

What is claimed is:

1. A method for freeform mathematical parsing comprising:
    defining, by a computing device, a grammar for an arithmetic expression, the grammar comprising an implicit multiplication expression and an implicit function expression;
    defining, by the computing device, a production in the grammar for known variables;
    defining, by the computing device, a production in the grammar for unknown variables;
    receiving, by the computing device, an ambiguous input;
    parsing, by the computing device, the ambiguous input based upon the grammar to generate a plurality of parse trees collectively defining the ambiguous input;
    making the plurality of parse trees available for grading; and
    assigning a grade to the ambiguous input based upon a comparison of at least one of the parse trees against a key.

2. The method of claim 1, wherein the implicit function expression is defined in terms of an interaction with the implicit multiplication expression.

3. The method of claim 1, wherein the grammar is derived from a kernel grammar having a variable production corresponding to a pre-defined variable name.

4. The method of claim 1, wherein the grammar includes an assimilator expression defining a function application that assimilates elements from the right of the assimilator expression into an argument of an associated function.

5. The method of claim 1, wherein the grammar includes a soliton expression defining a function application that multiplies elements from the right of the soliton expression to a result of an associated function.

6. The method of claim 1, further comprising defining a token for representing a partial parse of at least one of the parse trees, wherein the token includes a type and data representing an actual character in the ambiguous input.

7. The method of claim 1, further comprising assigning a priority score to each of a plurality of partial parses based upon a number of known variables and a number of unknown variables included in each of the partial parses.

8. The method of claim 7, further comprising synthesizing the priority score of at least one of the partial parses using a secondary priority score assigned to each of a plurality of subcomponents defining the at least one of the partial parses.

9. The method of claim 7, further comprising stratifying each the partial parses in an agenda based upon the priority score of each of the partial parses.

10. The method of claim 9, further comprising processing each of the partial parses in the agenda based upon the priority score of the partial parse.

11. The method of claim 7, further comprising comparing the priority score of at least a pair of the partial parses to eliminate spurious ones of the partial parses.

12. The method of claim 1, wherein the ambiguous input represents a multi-element mathematical expression.

13. The method of claim 1, wherein the step of assigning a grade to the ambiguous input based upon a comparison of at least one of the parse trees against a key is executed based upon set equality between the at least one of the parse trees and the key.

14. The method of claim 1, wherein the grade is defined by a ratio of a number of elements in the key located in the ambiguous input and a total number of elements in the key.

15. The method of claim 1, wherein the grade is defined by a ratio of a number of elements in the key located in the ambiguous input and a quantity defined by a sum of a total number of elements in the key and a total number of elements in the ambiguous input less a number of elements in the ambiguous input located in the key.

16. A method for freeform mathematical grading comprising the steps of:
    defining, by a computing device, a grammar for an arithmetic expression, the grammar comprising an implicit multiplication expression and an implicit function expression;
    defining, by the computing device, a production in the grammar for known variables;
    defining, by the computing device, a production in the grammar for unknown variables;

receiving, by the computing device, an ambiguous input including a plurality of elements collectively defining a mathematical expression;

parsing, by the computing device, the ambiguous input based upon the grammar to define each of the elements; and assigning, by the computing device, a grade to the ambiguous input based upon a grading routine comprising, comparing, by the computing device, each element of the ambiguous input against each of a plurality of elements of a key, verifying, by the computing device, whether each of the elements of the ambiguous input matches at least one of the elements of the key, verifying, by the computing device, whether each of the elements of the key matches at least one of the elements of the ambiguous input.

17. The method of claim 16, wherein the implicit function expression is defined in terms of an interaction with the implicit multiplication expression.

18. The method of claim 16, wherein the grammar includes an assimilator expression defining a function application that assimilates elements from the right of the assimilator expression into an argument of an associated function.

19. The method of claim 16, wherein the grammar includes a soliton expression defining a function application that multiplies elements from the right of the soliton expression to a result of an associated function.

20. A system for freeform mathematical parsing comprising:

a memory for storing a key; and a processor in signal communication with the memory, the processor configured to perform the steps of:

defining a grammar for an arithmetic expression, the grammar comprising an implicit multiplication expression and an implicit function expression;

defining a production in the grammar for known variables;

defining a production in the grammar for unknown variables;

receiving an ambiguous input;

parsing the ambiguous input based upon the grammar to generate a plurality of parse trees collectively defining the ambiguous input;

making the plurality of parse trees available for grading; and assigning a grade to the ambiguous input based upon a comparison of at least one of the parse trees against the key.

\* \* \* \* \*